United States Patent [19]

Horvath

[11] 3,767,269
[45] Oct. 23, 1973

[54] METHOD OF MAKING AND PIPELINE TRANSPORTING A NON-CORROSIVE SULFUR-WATER SLURRY
[75] Inventor: Richard J. Horvath, Houston, Tex.
[73] Assignee: Shell Oil Company, New York, N.Y.
[22] Filed: Mar. 23, 1971
[21] Appl. No.: 127,387

[52] U.S. Cl. .................................. 302/66, 302/15
[51] Int. Cl. ............................................ B65g 53/30
[58] Field of Search ...................... 137/13; 260/67; 302/14–16, 66

[56] References Cited
UNITED STATES PATENTS

| 3,438,680 | 4/1969 | Scheuerman et al. | 302/66 X |
| 3,663,478 | 5/1972 | Kuhre et al. | 302/66 X |
| 3,606,483 | 9/1971 | Gable | 302/14 |
| 3,361,213 | 1/1968 | Savins | 137/13 X |
| 2,947,578 | 8/1960 | Corneil et al. | 302/66 |
| 3,547,497 | 12/1970 | Bolger | 302/66 |
| 3,012,826 | 12/1961 | Puff et al. | 302/66 |
| 3,476,441 | 11/1969 | Elliott | 302/66 |
| 2,917,345 | 12/1959 | Phillips et al. | 302/66 |
| 3,480,332 | 11/1969 | Kuhre et al. | 302/66 |

Primary Examiner—Evon C. Blunk
Assistant Examiner—W. Scott Carson
Attorney—Harold L. Denkler and George G. Pritzker

[57] ABSTRACT

An improved method of making and pipeline transporting a sulfur-water slurry which is non-corrosive and non-clogging.

1 Claim, No Drawings

METHOD OF MAKING AND PIPELINE TRANSPORTING A NON-CORROSIVE SULFUR-WATER SLURRY

The invention is directed to a new, improved and novel method of making and transporting a sulfur-water slurry by pipeline which is noncorrosive and non-clogging by maintaining a passivating film of ammonia between said sulfur-water slurry and the interior wall of the pipeline or contacting equipment. In the case of pipeline transporting such sulfur-water slurry at a minimum velocity of 3 ft/sec, the ammonia is injected into the slurry line under conditions so that a passivating film of ammonia is maintained between the interior of the pipeline wall and the sulfur-water slurry transported in said pipeline. By maintaining such a film between the interior pipeline wall and the sulfur-water slurry which generally is maintained hot, corrosion and clogging of the pipeline can be inhibited or prevented. The ammonia film has been found to be essential in order to prevent direct contact of the sulfur-water slurry with the interior wall of the pipeline so as to prevent interaction between the sulfur and the interior surface of the pipeline wall and thereby prevent or inhibit corrosion, sulfide stress corrosion, hydogen embrittlement and deposition of sulfur and sulfur products on the pipeline wall thereby preventing clogging and sever corrosive damage to pipelines and equipment used in making and handling such slurry systems.

BACKGROUND OF THE INVENTION

The transportation of sulfur as a water slurry in pipeline is well known in the art as noted by reference to U. S. Pat. No. 2,917,345 or 2,947,578. In making such a sulfur-water slurry, the sulfur is generally sprayed in molten form into water to form a slurry which can be transported through a pipeline. Formation of a stable non-corrosive slurry wherein the sulfur does not undergo any undesirable change and cause corrosion or the slurry does not exhibit a tendency to wide variation in viscosity is essential to the process in addition to other problems which may be encountered during its transportation through a pipeline. Thus, separation of the sulfur from the carrier fluid, plating or coating of the sulfur on equipment and pipeline walls causing plugging of the pipeline, corrosion, viscosity changes due to pressure and temperature variations encountered in the line requiring increases in pumping power which increases operation costs, etc., are only a few of the problems normally encountered in making sulfur-water slurries for transporting through pipelines.

Although the above are serious problems for consideration in making and transporting sulfur slurries through pipelines, nevertheless the transportation of sulfur in slurry form through pipelines can be made to be an effective and economic means of transportation, particularly since sulfur is recovered or obtained from isolated, remote and inaccessible areas, and must be transported to desired accessible areas. As noted above, a number of methods have been proposed for making sulfur slurries for pipeline transportation of such slurries such as injecting molten sulfur into water thereby forming a sulfur slurry for pipeline transportation. Such sulfur slurries when transporting through pipelines generally do not overcome the corrosion, coating and/or plugging problems described above.

An objection of the present invention is to prepare for pipeline transportation a sulfur-water slurry which is stable, flowable and noncorrosive.

Another object of the present invention is to transport through a pipeline sulfur-water slurry without causing sulfur coating, deposition or plugging or corrosion of the pipeline.

Still another object of the invention is to form a slurry of sulfur in water, which when formed is stable, non-corrosive, and does not cause plugging when said slurry is transported through a pipeline and from which the sulfur can be readily recovered as essentially pure sulfur at the terminal end of the line.

Another object is to transfer sulfur as a water slurry by pipeline over great distances under non-corrosive conditions and at reduced pumping and handling costs.

Other objects will be apparent from the following description.

SUMMARY OF THE INVENTION

The present invention is directed to an improved, novel and new technique for preparing sulfur particles or pellets primarily for transportation as a sulfur-water slurry through pipelines which process is noncorrosive to the preparatory, transporting and recovery equipment, said process comprising maintaining a passivating film of ammonia between the interior ferrous wall of the equipment and the sulfur-water system while maintaining said sulfur-water system in a dynamic or static state and at an elevated temperature. The sulfur particles or pellets in the slurry should preferably have spherical shapes and dimensions in the ranges of 5–500, preferably 50–350 microns and still more preferred is having a mixture of different dimension of sulfur particles in the range of 5–20 percent in the 50–100 micron range and the balance 95–80 percent in the 150–350 micron range, prepared by injecting through multi-jet shrouded nozzles, the orifices opening of which can varied, molten sulfur into a vessel of water or ammoniated water which is in constant agitation while also injecting ammonia into said vessel so that it is in direct contact with the interior wall of the vessel. By controlling the jet orifice openings, the temperature of the molten sulfur from 150° F up to the melting point of sulfur, preferably in the range of 240°–320° F as it is injected into water directly or indirectly via a fluid (gaseous) barrier, while maintaining ammonia in the system, corrosion is prevented and spherical sulfur particles or pellets are formed of controlled dimensions. Also due to the presence of the ammonia in the system, agglomeration of sulfur is prevented. The amount of molten sulfur which can be injected into the water under conditions described in order to produce a stable non-clogging sulfur-water slurry can vary from about 5 percent to about 60 percent, preferably 10–40 percent sulfur in particles or pellet form of 50–350 microns, which is particularly suitable for pipeline transportation. Prior to injecting the sulfur-water slurry produced by the method described, the slurry should be in-line cooled to about 120° F or lower and thereafter injected into the main pipeline transporting system to a terminal station while at all times maintaining a film of ammonia between the interior of the pipeline wall and the slurry. This can be done by injecting ammonia along various points of the line where necessary and required. The ammonia in the line not only aids in preventing corrosion but improves flowability of the slurry by reducing friction and thereby reducing pumping costs. The amount of ammonia injected into and used in the pipeline should be sufficient to prevent direct contact of the slurry with the pipeline wall and is dependent on the amount of sulfur in the slurry, slurry temperature and slurry velocity. Generally the amount of ammonia required for this purpose can vary from about 0.01 percent to about 10 percent of the total slurry.

The sulfur-water slurry can be prepared by injecting into a reaction vessel containing water, molten sulfur through one or a series of shrouded or shielded nozzles positioned in the vessel so that the molten sulfur is injected directly or indirectly into preferably hot water (170°–212° F) under constant agitation while also injecting ammonia into the sulfur-water slurry system until a slurry 20–40 percent sulfur in spherical particles or pellets of 50–350 microns has been formed. The ammonia blanketed sulfur-water slurry is removed from the slurry vessel and directed into an ammonia containing in-line where it is cooled to about 120° F or lower and thereafter injected into a transporting pipeline for terminal delivery while injecting, at intermediate points in the transporting pipeline, ammonia in amount sufficient to maintain a protective barrier between the interior pipeline wall and the slurry. At the terminal end of the pipeline the ammonia is recovered and can be recycled for further use or sold or disposed at the terminal as the situation requires. The sulfur is separated from the water by conventional settling and/or filtration means. The sulfur recovered is in pellet or particle form which is easily handled and does not present a dusting or pollution problem.

The shrouded or shielded nozzles used to make the slurry can be those described in copending U.S. Pat. application Ser. No. 26,278, filed Apr. 7, 1970. Also rather than using one nozzle, a series of such nozzles can be installed in the slurry preparation vessel and the nozzle(s) can be positioned in various sections of the slurry preparation vessel. Thus the nozzles injecting molten sulfur into the water can be positioned above or below the water line in a downwards, upwards and/or sideward position and the hot water can be agitated or swirled in the same or opposite direction of the sulfur injection stream by any suitable means in order to get better sulfur particle size control. Thus if fine sulfur particles of 5–100 microns are desired, the water should be stopped and its temperature dropped essential to ambient temperature.

The water carrier can contain anti-bonding or anti-agglomerating agents, suspending agents and additives which help keep the slurry stable during preparation, storage, and pipeline transportation. Such materials include asphaltenes, polymers, surfactants, and these should be used in small amounts of 5–1,000 ppm and should be readily removable from the sulfur slurry system at the recovery end of the line so that the recovered sulfur is pure and meets all commercial standards.

PREFERRED EMBODIMENT OF THE INVENTION

About 15 percent of molten sulfur was injected through a shrouded nozzle directly into water at ambient temperature while blanketing the system with ammonia. The temperature of the water was increased to about 170° F and while constantly agitating it an additional 5 percent molten sulfur was injected into the hot swirling water in the presence of ammonia as noted above to produce sulfur particles of finer size than the initially produced particles. The 20 percent sulfur-water slurry thus produced consisted of a mixture of sulfur particles in the range of 100–350 microns and 5–75 microns.

The slurry was cooled to below 120° F and exposed to 2.0 inch ground carbon-steel test specimens and the results are shown in Table 1:

| % wt/ $NH_3$ | pH | Corrosion Rate 72°F | Mils/yrs* 140°F |
|---|---|---|---|
| 0 | 9.4 | 460 | 770 |
| 0.01 | 10.4 | 5 | 370 |
| 0.5 | 11.1 | 1 | 2 |
| 1.1 | 11.3 | 1 | 1 |

*Determined from weight loss and exposure time

At the terminal end of the line, the water was readily separated from the sulfur by settling and filtration.

The foregoing description of the invention is merely intended to be explanatory thereof. Various changes in the details of the described method may be made within the scope of the appended claims without departing from the spirit of the invention.

I claim as my invention:

1. A method of transporting sulfur through a pipeline to a terminal station while preventing corrosion and plugging of the line comprising the steps:
   a. injecting 5–50 percent molten sulfur into hot swirling water in the presence of ammonia through multi-shrouded nozzles, the direction of the molten sulfur injection being opposite to the swirling action of the hot water, a portion being injected into still water at a temperature lower than that of the swirling water;
   b. cooling the slurry (a) to below 120° F;
   c. injecting slurry (b) into a pipeline while simultaneously injecting ammonia into the line; and
   d. transporting the ammonia-slurry system to a terminal station.

* * * * *